Patented Nov. 13, 1928.

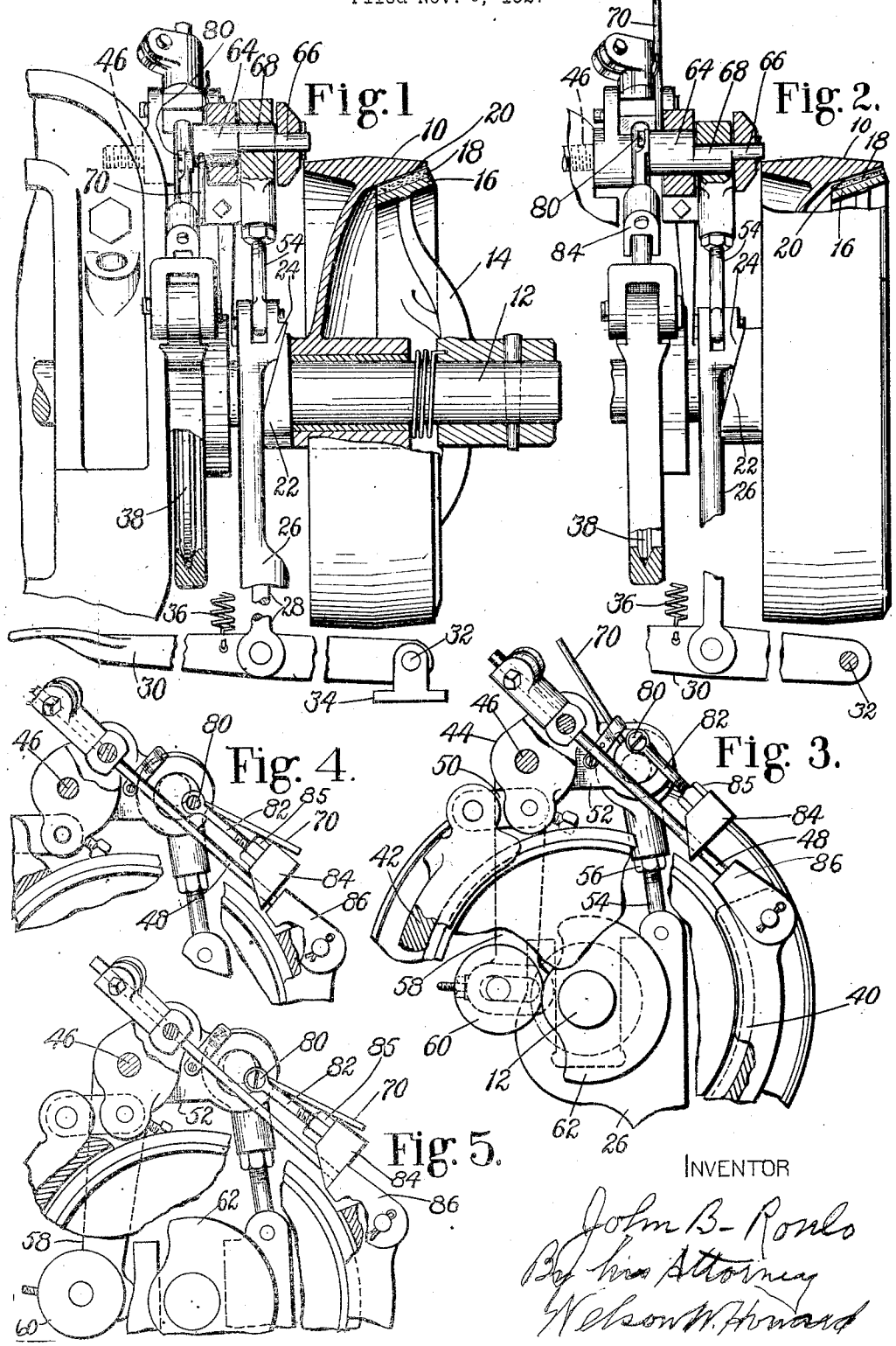

1,691,130

UNITED STATES PATENT OFFICE.

JOHN B. ROULO, OF BEVERLY, MASSACHUSETTS, ASSIGNOR TO UNITED SHOE MACHINERY CORPORATION, OF PATERSON, NEW JERSEY, A CORPORATION OF NEW JERSEY.

SAFETY DEVICE.

Application filed November 5, 1927. Serial No. 231,260.

This invention relates to safety devices and particularly to a device for enabling a clutch operated, power driven machine to be turned over by hand safely while the power is on.

In various kinds of machines it is necessary, in making certain adjustments and repairs, to turn the machine over by hand. As an example of a machine of this type there may be cited the staple fastening machine shown and described in Letters Patent of the United States No. 1,016,930, granted Feb. 13, 1912, on an application of William H. Borden. It is possible, in many machines of the type mentioned, when repairs or adjustments are necessary, to release the brake by a slight downward movement of the treadle so that the machine may be turned over by hand without starting the machine under power. A further movement of the treadle will, however, throw the clutch into operation and drive the machine at its usual speed. If, as is possible, this further depression of the treadle is made accidentally, while the operator is reaching to make an adjustment or a repair, then the machine will be driven, with the consequent chance of injuring the operator or of damaging the machine or some of its parts.

In view of the foregoing, the machine shown in said Patent No. 1,016,930 has, in the past, been provided with a treadle and clutch mechanism by which the machine could be adjusted to run in the usual manner only when the treadle is depressed enough to reach the floor and, when the operator wished to adjust or repair the machine, the throw of the clutch engaging mechanism could be changed by means of a convenient hand lever so that depression of the treadle to the floor would release the brake without engaging the clutch. This mechanism has not been found entirely satisfactory in practice because the treadle mechanism could not be adjusted until the machine was placed in the factory in the position it was to be run and, if a piece of leather or other stray material became caught under the treadle, the operator might be unable to engage the clutch sufficiently for the machine to run. It has, therefore, become the custom in shoe factories, to adjust the treadle of this machine so that it is a sufficient distance above the floor to prevent the above trouble from occurring, thus going back to the dangerous conditions which might cause the injuries and damages referred to above.

An object of the present invention is to provide, in machines of this type, improved means operable when desired, to prevent movement of the treadle beyond the point where the brake is released, thereby enabling the operator to turn the machine over by hand. Thus the treadle can be so adjusted that it will clear the floor at all times.

A further object of the invention is to make such means simple and so constructed that it may be rendered inoperative during the ordinary operation of the machine and be conveniently rendered operative, when desired, without the use of tools. Another object is to provide a device for the above purpose which may be easily applied to machines in actual use in factories without making material changes in existing parts of such machines and preferably so arranged that the safety device may be operated by moving its controller in the same manner as in the case of the earlier device but with absolute surety that the clutch will not be engaged, notwithstanding the position in which the treadle is adjusted above the floor level.

The illustrated machine is provided with a continuously driven loose pulley and the main shaft of the machine is provided with a friction cone secured thereon. By means of a treadle and wedge mechanism, the loose pulley may be moved along the shaft so that a conical face thereon will come into engagement with the friction cone and the machine be driven through the loose pulley, thus forming a usual type of clutch. Between the main shaft and the machine frame is a brake mechanism which is arranged to be set by the power of the machine at a predetermined point in the operation of the main shaft after the treadle is released to bring the machine to rest. Before the movement of the treadle to start the machine can produce engagement of the clutch, a connection to the treadle is arranged to release the brake. This is accomplished by a downward movement of the treadle rod operating on a bell crank and link mechanism, and a feature of the invention consists in arranging a stop member connected to this mechanism in such a way that, when the safety mechanism is rendered operative, the stop will have greater motion than another member of the mechanism and in so adjusting the stop member that it will engage the slower moving member at the time that the brake is fully released but before the clutch is engaged. In this way depression of the treadle will release the brake but the clutch is not and cannot be engaged. The machine is, therefore, free to be turned over by hand without danger, because the treadle cannot be sufficiently depressed to start the machine, irrespective of the height at which the treadle is adjusted above the floor. To put the machine in condition for operation it is only necessary, in the illustrated construction, to throw a small hand lever corresponding in position to that of the earlier construction. This withdraws the stop to a point where it cannot engage the slower moving member.

Other features of the invention will be apparent when the accompanying description is considered in connection with the accompanying drawing, in which—

Fig. 1 is a side elevation, partly in section, of the clutch and brake mechanism of a staple fastening machine equipped with the safety device of the present invention, the safety device being set in a position to permit the machine to be turned over by hand whenever the treadle rod is depressed;

Fig. 2 shows the mechanism of Fig. 1 with the safety device set to permit the machine to operate in the usual manner;

Fig. 3 is an end view of the brake mechanism and the safety device, with the safety device set for the usual operation of the machine, the parts being shown in stopped position with the treadle rod raised and the brake on;

Fig. 4 is a fragmentary view of the parts shown in Fig. 3 which are immediately associated with the safety device, with the safety device thrown into operative position but before the treadle rod has been depressed; and Fig. 5 is a view of the parts shown in Fig. 4 with the safety still in operative position but after the treadle rod has been depressed and the brake released, so that the safety device is in position to prevent further movement of the treadle and permit the machine to be safely turned over by hand.

The illustrated machine is provided with a loose pulley 10 which turns on the main shaft 12 of the machine. The main shaft has secured to it a spider 14 which carries a clutch cone 16 having a facing 18 of leather or other friction material. This leather engages a co-operating cone surface 20 on the pulley 10. In order to engage the clutch, the pulley 10 is arranged to slide longitudinally along the shaft 12 by means of the usual double wedge mechanism using the two wedges 22 and 24. The wedge 22 is arranged to engage the pulley and the wedge 24 is a part of a member 26 which is connected to a treadle rod 28 connected to the usual treadle 30 which is pivoted at 32 on a bracket 34. The treadle is normally retained in raised position by a spring 36 connected between the treadle and a fixed part (not shown) of the machine.

Before the clutch can be engaged, it is necessary to release the brake of the machine. The brake mechanism includes a brake wheel 38 secured to the main shaft of the machine. The brake wheel is engaged by two brake shoes 40 and 42 which are connected by a pivot (not shown) at their lower ends. The operation of the brake shoes is controlled by a bell crank lever 44 which is mounted on a pivot 46 extending from the machine. The bell crank lever 44 is pivotally connected to the two brake shoes 40 and 42 by means of links 48 and 50. One arm 52 of the bell crank lever 44 is pivotally connected by an eccentric pin (the operation of which will later be described) with the member 26 which carries the wedge 24. This connection is made adjustable by means of the threaded rod 54 and check nut 56. It will be seen from the above arrangement of parts that depression of the treadle 30 depresses the member 26 thereby pulling on the adjustable connection 54 and rotating the bell crank lever 44 in a clockwise direction as seen in Figs. 3, 4 and 5. This motion produces a thrust on the links 48 and 50 which releases the brake shoes 40 and 42. The adjustable connection 54 is adjusted so that the brake is released before it is possible for the clutch to become engaged through the action of the wedges 22 and 24 on the pulley 10.

In order that the machine may complete the revolution or cycle which is taking place when the treadle 30 is released and then stop at the proper point in the cycle preparatory to a restarting of the machine, an automatic stop mechanism is provided. This consists of the downwardly depending arm 58 of the bell crank 44 in which arm is adjustably mounted a cam roll 60 arranged to co-operate with a cam 62 fixed to the main shaft 12 of the machine. This cam and cam lever are so arranged that when the treadle is released at the time that the cam roll 60 is opposite the low part of the cam 62, the spring 36 of the treadle will disengage the clutch and then apply the brake by lifting, through the treadle connections, the arm 52 of the bell crank which will cause the brake shoes to engage the brake wheel 38 and stop the machine. On the other hand, when the treadle is released with the cam roll 60 opposite the high part of the cam 62, the high part of the cam will maintain the parts in running condition and will not permit the spring 36 to lift the treadle to disengage the clutch and apply the brake until the cam roll drops off the high part of the cam on to the low part.

The above parts were all applied to the machine of the above-mentioned patent before the present invention was made, as was the eccentric mechanism about to be described, which constitutes a portion of the previous, and not wholly satisfactory safety device. The eccentric connection consists of an eccentric pin having two concentric portions 64 and 66 and an offset eccentric portion 68. This eccentric may be rotated through an angle somewhat less than 180° by means of a small hand lever 70 projecting radially from the portion 64 of the eccentric. When the eccentric is turned so that the handle 70 is up and the eccentric portion 68 is down, as shown in Fig. 2, the wedge 24 is moved downwardly and the clutch is brought nearer into engagement so that upon downward movement of the member 26, and the other parts connected to the treadle 30, the clutch is brought into engagement soon after the brake is released. With the handle 70 placed in the downward position so that the eccentric portion 68 is in raised position, the wedge 24 is lifted and there is an increased separation between the clutch members 10 and 18. When thus arranged, upon downward movement of the treadle 30, lost motion is encountered between the time that the brake is released and the clutch engaged. This arrangement produces the earlier form of safety device in which the treadle was intended to touch the floor at the time the brake is released and before the clutch is engaged. Owing to difficulties of adjustment, including irregularity of floor levels in factories and the varying conditions of the clutch member 18, together with the liability of stray materials becoming lodged on the floor under the treadle, this arrangement was unsatisfactory. The invention whereby a satisfactory safety device has been produced using the above existing parts with only small additions will now be described.

The large portion 64 of the eccentric is provided with a screw 80 tapped into it near its outer edge and nearly diametrically opposite the eccentric portion 68. From this screw 80 an adjustable connection 82, pivotally connected to the screw, extends diagonally downward and is threaded into a stop 84 which is locked in adjusted position by a check nut 85. The stop is slotted to lie on the link 48 but may be lifted from the link for adjustment. When the handle 70 is in raised position (Fig. 3) for ordinary operation of the machine, the stop 84 performs no function whatever. When the handle 70 is brought down so that it rests on the stop 84, as in Fig. 4, the stop clears the enlarged portion 86 of the link 48 and still performs no function. However, when the treadle is depressed with the handle in the position shown in Fig. 4, the parts assume the position shown in Fig. 5, and the stop 84 abuts against the enlargement 86 of the link 48 so that no further movement of the treadle can take place. The stop is adjusted so that when the parts are in this position, (with the treadle depressed) the brake is released but the clutch is not engaged and, as the treadle can move no farther, there is no possibility of the machine starting and causing injury to the operator or damage to the machine or its parts.

It should be noted that the arrangement of the linkages is such that, while downward movement of the treadle causes the enlarged portion 86 of the link 48 to move downwardly, in addition to producing a similar movement of the stop 84, the movement of the part 86 is slower than that of the stop 84 and stop 84 soon overtakes the part 86. After the stop 84 engages the enlargement 86 no further movement can take place.

It will thus be seen that, by this arrangement, without interfering with the normal operation of the machine, an effective safety device has been produced whereby, when repairs and adjustments are being made, it is impossible to engage the clutch and start the machine in operation and that the treadle adjustments and other adjustments of the parts can be made where the machine is manufactured before it is put out into the factory where the machine is to be used or at any time thereafter.

In the following claims, reference is made to a treadle but any other suitable or usual means by which an operator may control a machine may be substituted for the treadle and still come within the scope of these claims.

Having thus described my invention, what I claim as new and desire to secure by Letters Patent of the United States is:

1. A safety device for a brake and clutch mechanism for preventing operation of the clutch after the brake has been released, comprising a treadle, and two members operatively connected with the treadle to move relatively toward each other upon movement of the treadle and so constructed and arranged that when the members come in contact with each other further movement of the treadle and engagement of the clutch are prevented.

2. A safety device for a brake and clutch mechanism for preventing operation of the clutch after the brake has been released, comprising a treadle, two members operatively connected with the treadle to move relatively toward each other upon movement of the treadle and so constructed and arranged that when the members come in contact with each other further movement of the treadle and engagement of the clutch are prevented, and means to change the range of movement of one of said members.

3. A safety device for a brake and clutch mechanism for preventing operation of the clutch after the brake has been released, comprising a treadle, two members operatively connected with the treadle to move relatively toward each other upon movement of the treadle and so constructed and arranged that when the members come in contact with each other further movement of the treadle and engagement of the clutch are prevented, and an eccentric mechanism movable to prevent said members from coming in contact during normal operation of the machine.

4. A safety device for a brake and clutch mechanism for preventing operation of the clutch after the brake has been released, comprising a treadle, two members operatively connected with the treadle to move relatively toward each other upon movement of the treadle and so constructed and arranged that when the members come in contact with each other further movement of the treadle and engagement of the clutch are prevented, and means to permit one of the members to be taken from its normal position to allow adjustment of said member.

5. A safety device for a brake and clutch mechanism for preventing operation of the clutch after the brake has been released, comprising a treadle, and two members operatively connected with the treadle to move at different speeds in the same direction upon movement of the treadle and so constructed and arranged that when one member overtakes the other they co-act to prevent further movement of the treadle and consequent engagement of the clutch.

6. A safety device for a brake and clutch mechanism for preventing operation of the clutch after the brake has been released, comprising a treadle, two members operatively connected with the treadle to move at different speeds in the same direction upon movement of the treadle and so constructed and arranged that when one member overtakes the other they co-act to prevent further movement of the treadle and consequent engagement of the clutch, and means to change the range of movement of the first one of said members so that it will not overtake the other when it is desired that the clutch be operated.

7. A treadle operated brake and clutch mechanism comprising a clutch, a brake drum, a brake shoe, a lever, a pivot for the lever, a link connecting the brake shoe with the lever, an abutment, a controller movable to either of two positions, a stop connected with the controller, the stop being inoperative when the controller is in one position, and being operative when the controller is in the other position to come into contact with said abutment upon depression of the treadle, said contact preventing further movement of the treadle and consequent engagement of the clutch.

8. A treadle operated brake and clutch mechanism comprising a clutch, a brake drum, a two-piece brake band, a bell crank, a fixed pivot for the bell crank, links connecting the ends of the brake band with the bell crank, an abutment on one of the links, an eccentric on the bell crank movable to either of two positions, a stop connected with the eccentric, the stop being inoperative when the eccentric is in one position, and being operative when the eccentric is in the other position to come into contact with said abutment upon depression of the treadle, said contact preventing further movement of the treadle and consequent engagement of the clutch.

In testimony whereof I have signed my name to this specification.

JOHN B. ROULO.